United States Patent
Burns et al.

[11] 3,856,379
[45] Dec. 24, 1974

[54] OPTICAL MIXING DEVICE EMPLOYING NONCRITICAL PHASE MATCHING IN WAVEGUIDES

[75] Inventors: William K. Burns; Ronald A. Andrews, both of Alexandria, Va.

[73] Assignee: The United States of America as represented by the Secretary of the Navy, Washington, D.C.

[22] Filed: Aug. 20, 1973

[21] Appl. No.: 389,750

[52] U.S. Cl. .......... 350/96 WG, 350/160 R
[51] Int. Cl. .............................. G02b 5/14
[58] Field of Search .......... 350/96 WG, 160 R

[56] References Cited
UNITED STATES PATENTS

| | | |
|---|---|---|
| 3,311,845 | 3/1967 | Koester............ 350/96 WG UX |
| 3,537,020 | 10/1970 | Anderson............ 350/96 WG UX |
| 3,617,109 | 11/1971 | Tien............................ 350/96 WG |
| 3,802,760 | 4/1974 | Sosnowski.................. 350/96 WG |

*Primary Examiner*—John K. Corbin
*Attorney, Agent, or Firm*—R. S. Sciascia; Arthur L. Branning; Melvin L. Crane

[57] ABSTRACT

A device for achieving optical mixing in optical waveguides which is not dependent upon a precise and uniform waveguide thickness. This result is accomplished by using an almost symmetric waveguide geometry, narrow waveguide widths and the lowest order TE or TM modes. Such systems are used for harmonic generation, parametric oscillation, and upconversion of radiation.

10 Claims, 4 Drawing Figures

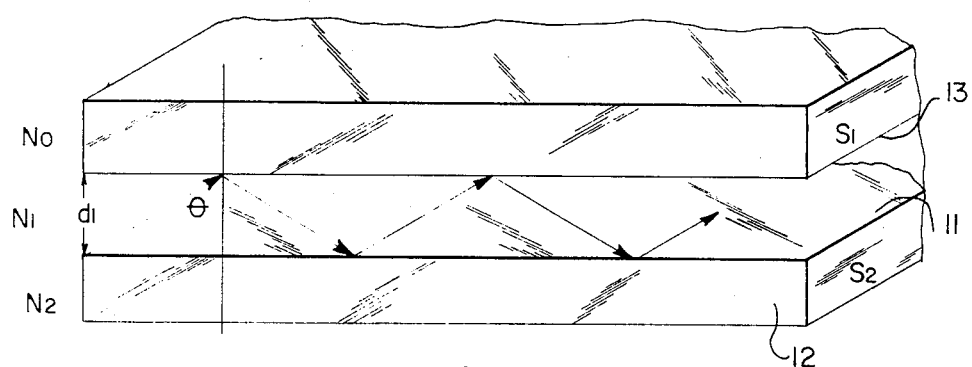
FIG. 1
FIG. 3
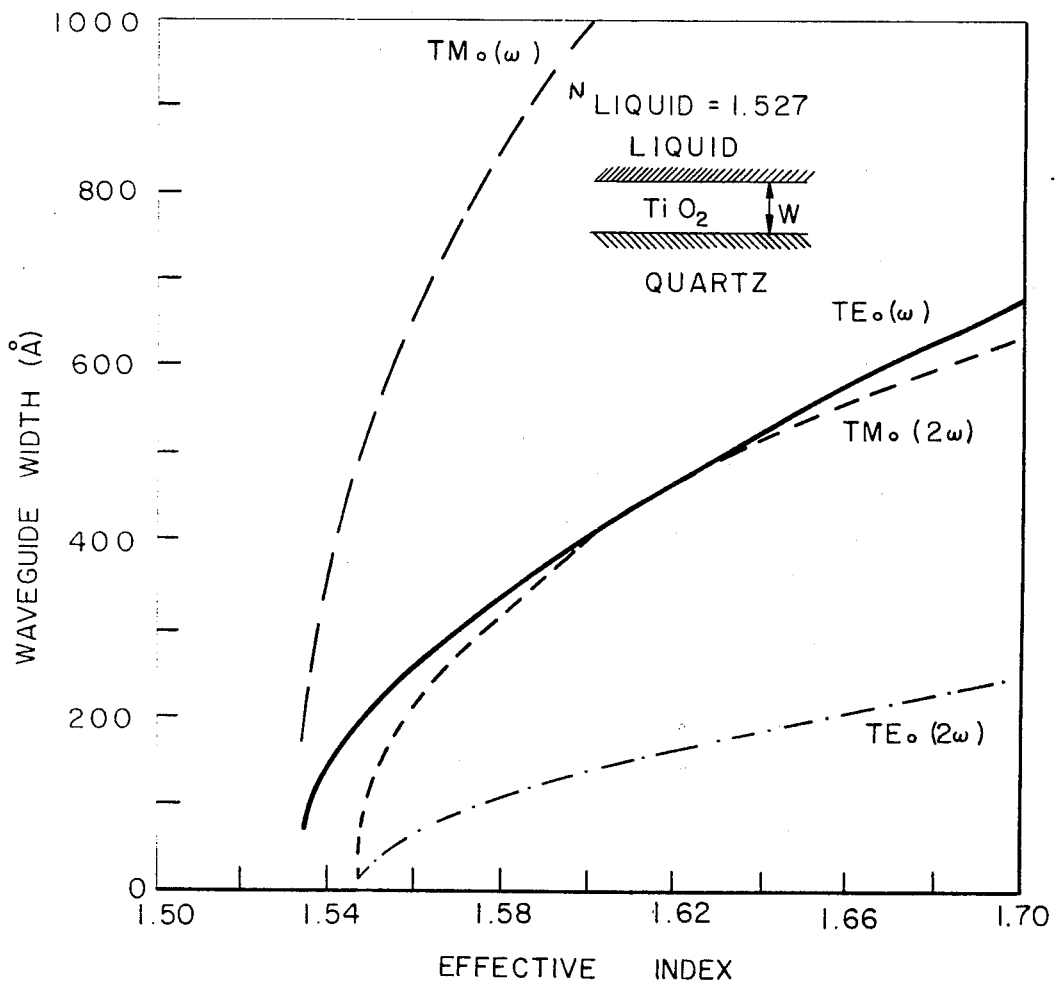

OPTICAL MIXING DEVICE EMPLOYING NONCRITICAL PHASE MATCHING IN WAVEGUIDES

BACKGROUND OF THE INVENTION

This invention relates to optical waveguides and more particularly to noncritical phase matching in optical waveguides which does not depend upon a precise and uniform waveguide thickness.

Heretofore solid state optical waveguides have been used as light transmission devices. Such a system has been set forth in an article, "Light Waves in Thin Films and Integrated Optics," by P.K. Tien, Applied Optics 10, page 2,395, 1971. Previously, it has been recognized that it is possible to phase match a nonlinear optical mixing process in an optical waveguide using the inherent waveguide dispersion. This method has serious problems. If waveguides with many modes are used, then the coupling of light to unwanted modes either by scattering or nearly phase matched interactions can seriously degrade the efficiency. In general, the phase match condition depends on the waveguide thickness. Precise waveguide thicknesses, within tight tolerances, are required which are difficult to fabricate. Present art of fabricating waveguides enables one to make a waveguide which at best varies in thickness and are usually tapered in the thickness profile. Such waveguides do not produce acceptable phase matching since the efficiency of phase matched optical mixing processes critically depend upon waveguide thickness.

SUMMARY OF THE INVENTION

This invention provides an optical waveguide configuration which can phase match an optical mixing process in the waveguide which is not critically dependent on the waveguide thickness. This is accomplished by using a substantially symmetric waveguide geometry, narrow waveguide widths and the lowest order TE and TM modes. By using these modes near cutoff, the phase shifts on total internal reflection may be adjusted to achieve phase matching. In this situation, the phase match condition is independent of waveguide width in a first approximation. This "non-critical" phase matching eases the requirements on waveguide fabrication and permits the use of only zero-order modes.

BRIEF DESCRIPTION OF THE DRAWINGS

FIG. 1 illustrates a well known prior art waveguide.

FIG. 3 illustrates mode dispersion curves that demonstrate non-critical phase matching for second-harmonic generation in a liquid/$TiO_2$/quartz waveguide.

DESCRIPTION OF THE INVENTION

Figure 2:
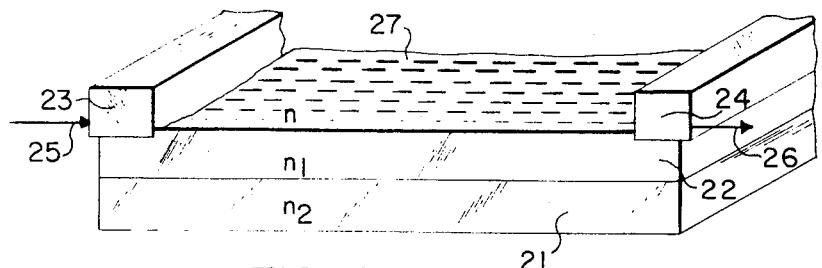
FIG. 2 illustrates a waveguide made in accordance with this invention.

Now referring to the drawings, there is shown by illustration in FIG. 1 an optical waveguide of the prior art. An optical waveguide is a slab of dielectric material which confines light by multiple total internal reflections. As shown, the optical waveguide includes a thin film 11 having an index of refraction, $N_1$, applied onto a substrate 12 having an index of refraction, $N_2$, with a medium 13 above the film 11 having an index of refraction, $N_0$, where $N_1 > N_0$, and $N_2$. $N_0$ and $N_2$ may be the same or different. A plane wavefront is totally reflected alternately between the interfaces $S_1$ and $S_2$ provided the angle of incidence $\theta$ is greater than the critical angles. For a given thickness, $d_1$ and indices $N_0$, $N_1$, and $N_2$, light will propagate with an angle of incidence $\theta$, only if, after two successive reflections, the wavefront is again in phase with any portion of the original wavefront that was not involved in these two reflections. If this were not the case, after many reflections wavefronts with a range of phases between 0 and $2\pi$ would add to zero amplitude, or equivalently, the wave would not propagate.

Nonlinear interactions in optical waveguides can be phase matched by utilizing inherent waveguide dispersion. Such phase matching is important because it makes a large class of nonlinear materials with little or no birefringence usable for phase matched parametric processes. In general, this type of phase matching requires a precise waveguide width within tight tolerances, which in the prior art is difficult to fabricate. The present invention overcomes these difficulties.

FIG. 2 illustrates a waveguide made in accordance with the teaching of the present invention. The waveguide materials are transparent in the frequency region of interest. The waveguide includes a substrate 21 of an optically transparent linear or nonlinear dielectric material such as crystalline quartz glass, ADP, etc., supporting a waveguide layer 22 of a high index dielectric film such as $TiO_2$, or ZnSe. Input and output couplers 23, 24 such as prisms, gratings or any well known coupling means couples light 25 into the waveguide with the resultant mixed light 26 coupled out through coupler 24. A suitable liquid 27 having an index of refraction substantially the same as that of the substrate overlaps the waveguide layer. Such liquids include index tunable oils or organics tuned by physically changing the material, temperature or electric field. The index of refraction of the substrate $N_2$ and the liquid N are less than that of the waveguide material $N_1$. In order to achieve phase matching for different situations, the liquid is one in which the index of refraction can be varied to achieve non-critical phase match situations, that is, the liquid index may be tuned. Let $\beta$ be the wave vector component in the direction of propagation for radiation in a bound waveguide mode. Then $\beta/k$ is the effective index of refraction for a waveguide mode, where $k = \omega/c$ is the free space wave vector. All waveguide modes of interest are near cutoff such that $\beta/k \approx N_0$. The dependence of waveguide width (W) on the above parameters is given by the following equations for the lowest order TE and TM modes:

$$W_{TE}(\omega) \approx 2[(\beta/k)^2 - N_0^2]^{1/2}/k(\omega) [N_1^2 - (\beta/k)^2] \quad (1)$$

$$W_{TM}(\omega) \approx 2(N_1^2/N_0^2)[(\beta/k)^2 - N_0^2]^{1/2}/k(\omega)[N_1^2 - (\beta/k)^2 \omega]$$

For SHG, the phase match condition is $(\beta/k) = (\beta/k)_2$. Waveguide widths which satisfy the phase matching requirement are determined from intersections of the mode dispersion curves ($W$ vs $\beta/k$) for $\omega$ and $2\omega$. Consider a TE($\omega$) and a TM($2\omega$) mode. Eq. (1) and the phase match condition give $$W_{TM}(2\omega) \approx (N_1^2/2N_0^2)\, W_{TE}(\omega) \tag{2}$$

Choose $N_1/N_0 = \sqrt{2}$ and both the guide widths and their slopes $[dW/d(\beta/k)]$ are approximately equal. The mode dispersion curves are tangent and phase matching is independent of waveguide width in the region of tangency.

FIG. 3 illustrates mode dispersion curves demonstrating non-critical phase matching for second-harmonic generation in a liquid/$TiO_2$/quartz waveguide. The index of refraction of the liquid was 1.525 at $\omega$ and 1.547 at $2\omega$. The ratio of the index of refraction of $TiO_2$/quartz was 1.65, at $\omega$, and 1.77, at $2\omega$. Waveguide widths which satisfy the phase-matching requirement are determined from intersections of the mode dispersion curves for $\omega$ and $2\omega$. The mode dispersion curves are tangent, and phase matching is independent of waveguide width in the region of tangency between 400 and 500 Å.

The effect of bulk material dispersion has been neglected in equations 1 and 2, but is included in the exact mode dispersion equations plotted in FIG. 3. The effect of bulk dispersion is to make the mode dispersion curves begin from different "cut-off" points which represent minimum allowed values of $\beta/k$ and W. The slopes of the mode dispersion curves near the cut-off points are adjusted to be equal by the choice of materials as expressed in the ratio $N_1/N_0 = \sqrt{2}$. Exact coincidence of the mode dispersion curves near cut-off is obtained by tuning the refractive index of the liquid. This moves the curves relative to each other until the desired tangency is obtained. However if a suitable range of liquids, or other index graded materials, is available with known indices, it is possible to fabricate a waveguide and achieve phase matching, without index tuning.

For the general three-wave interaction Equation (1) can be inverted with the approximation $W <<$ wavelength $(\lambda)$ to obtain $\beta_{TE}(\omega) \approx N_0 k(\omega) + [W^2 k^3(\omega)/8\, N_0](N_1^2 - N_0^2)^2$, $$\beta_{TM}(\omega) \approx N_0 k(\omega) + W^2 k^3(\omega)/8\, N_0\, (N_0/N_1)^4 (N_1^2 - N_0^2)^2. \tag{3}$$

For an interaction of the type $(\omega_1)_{TE} + (\omega_2)_{TE} = (\omega_3)_{TM}$, the phase match condition is $\beta_{TE}(\omega_1) + \beta_{TE}(\omega_2) = \beta_{TM}(\omega_3)$. Non-critical phase matching also requires the derivative of the phase match condition with respect to W be satisfied. Both criteria are obeyed when the wave vectors and material indices are related by $$k_1^3 + k_2^3 \approx (N_0/N_1)^4\, k_3^3. \tag{4}$$

Equation (4) is the general requirement for noncritical phase matching in a symmetric, non-dispersive waveguide. If the frequency division is defined by $\omega_1 = (1+\epsilon)\omega_3/2$ and $\omega_2 = (1-\epsilon)\omega_3/2$, Equation (4) can be recast in the form $$N_1/N_0 \approx (4/1+3\epsilon^2)^{1/4} \tag{5}$$

Figure 4:
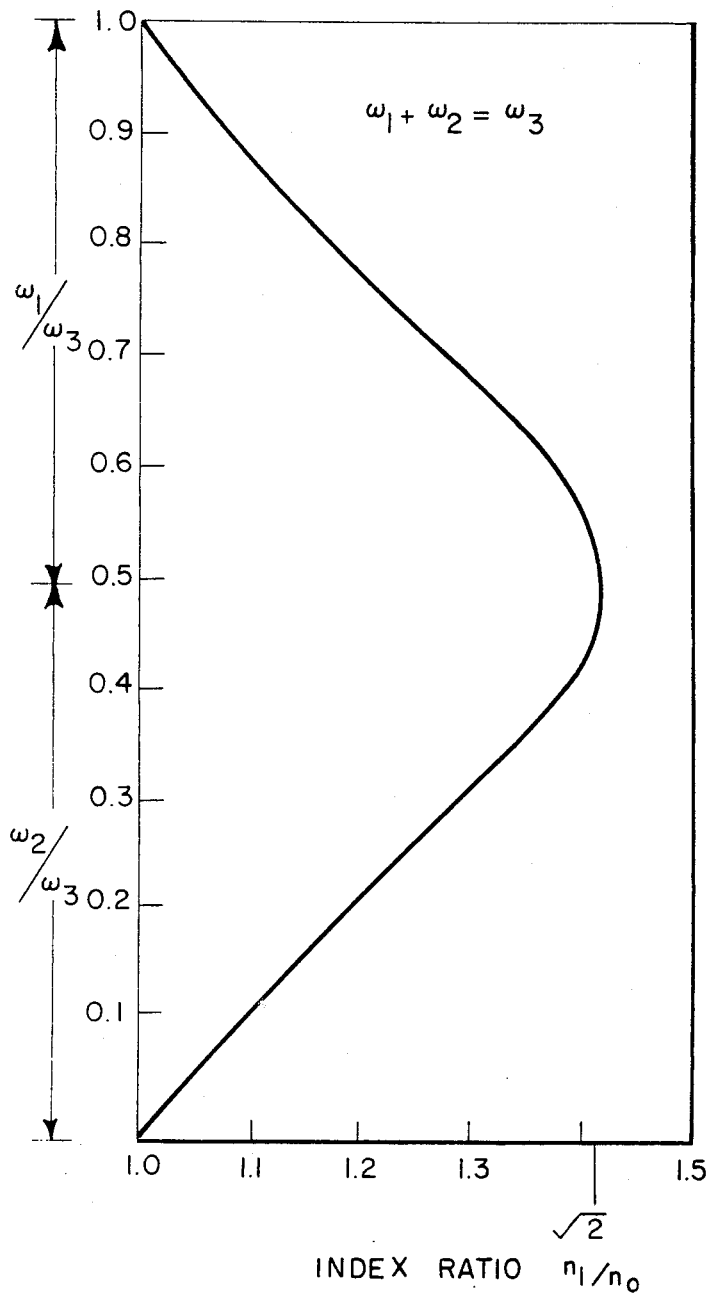
FIG. 4 illustrates a tuning curve for a noncritically phase-matched parametric process as a function of the index ratio $N_1/N_0$ of a symmetric nondispersive waveguide.

The tuning curve represented by Equation (5) is plotted in FIG. 4. It gives the index ratio $N_1/N_0$ required to noncritically phase match any desired frequency combination. The degenerate point ($\omega_1 = \omega_2$) representing SHG occurs at $N_1/N_0 = \sqrt{2}$ as obtained previously. Bulk material dispersion can be dealt with in the general case, as discussed previously for SHG, by index tuning one of the waveguide materials.

Noncritical phase matching is achieved by adjusting the different phase shifts on total internal reflection of the TE and TM modes. Also, it requires nonlinear susceptibilities that transform TE modes into TM modes. Fortunately, the second order nonlinear susceptibility tensor nearly always provides the necessary 90° polarization rotation. Such phase matching can only be obtained for lowest order modes, near cutoff, so that the required waveguide structure will be very thin. These thin waveguides will only support lowest order modes, so there will be no mode coupling to higher order modes. However, a possible problem is likely to be losses due to surface scattering. The film thickness itself is not so important because surface scattering loss is inversely proportional to the effective waveguide width, which includes the high field region outside the film. This effective width can be ~10 times the film thickness when non-critically phase matched. This large evanescent field penetration increases the efficiency of the nonlinear interaction when nonlinear substrates are used. The advantage of noncritical phase matching is that it satisfies both the phase match condition and the derivative of the phase match condition with respect to waveguide width over some region of the mode dispersion curves. This means that for suitably constructed waveguide structures small fluctuations in film thickness will not limit the coherence length of the nonlinear interaction.

Obviously many modifications and variations of the present invention are possible in light of the above teachings. It is therefore to be understood that within the scope of the appended claims the invention may be practiced otherwise than as specifically described.

What is claimed and desired to be secured by letters Patent of the United States is:

1. A substantially symmetric optical waveguide which for noncritical phase matching comprises:
   an optically transparent dielectric material substrate of substantially uniform thickness;
   a high index dielectric film supported by said substrate, and
   an index of refraction tunable liquid supported upon and overlying said dielectric film;
   said dielectric film having an index of refraction greater than said substrate and said liquid an input optical coupler on one end of said waveguide for coupling radiation into said waveguide, an output optical coupler on the opposite end of said waveguide for coupling radiation out of said waveguide, whereby radiation coupled into and out of said symmetrical waveguide is phase matched by tuning said liquid.

2. An optical waveguide as claimed in claim 1, wherein:
   said substrate is a nonlinear material.

3. An optical waveguide as claimed in claim 1, wherein:
   said substrate is a linear material and said film is nonlinear.

4. An optical waveguide as claimed in claim 1, wherein:

said high index dielectric film is nonlinear.

5. An optical waveguide as claimed in claim 4 wherein:
said film is TiO$_2$.

6. An optical waveguide as claimed in claim 5, wherein: said liquid is index tunable oil.

7. An optical waveguide as claimed in claim 4, wherein: said film is ZnSe.

8. An optical waveguide as claimed in claim 7, wherein:
the relationships between the index of refraction of the waveguide material is $N_1/N_0 \approx [4/(1+3\epsilon^2)]^{1/4}$ where $N_0$ is the index of refraction of the liquid and $N_1$ is the index of refraction of the dielectric film and $\epsilon$ is defined by $$\omega_1 = (1+\epsilon)\omega_3/2 \quad \omega_2 = (1-\epsilon)\omega_3/2$$

where parametric interaction is defined by $$\omega_1 + \omega_2 = \omega_3$$

and the waveguide is nearly symmetric with the substrate index $\approx N_0$.

9. An optical waveguide as claimed in claim 1, wherein: said optically transparent dielectric material is glass.

10. An optical waveguide as claimed in claim 1, wherein: said liquid is index tunable oil.

* * * * *